United States Patent [19]

Policastro et al.

[11] Patent Number: 4,945,147

[45] Date of Patent: Jul. 31, 1990

[54] AROMATIC POLYESTER-SILOXANE BLOCK COPOLYMERS AND METHOD FOR MAKING

[75] Inventors: Peter P. Policastro, Niskayuna, N.Y.; Pamela K. Hernandez, North Olmsted, Ohio; Sandra A. Swint, Schenectady, N.Y.; Gary C. Davis, Albany, N.Y.; Jonathan D. Rich, Rexford, N.Y.; Philip J. McDermott, Clifton Park, N.Y.; Thomas L. Guggenheim, Scotia, N.Y.

[73] Assignee: General Electric Company, Schenectady, N.Y.

[21] Appl. No.: 319,027

[22] Filed: Mar. 6, 1989

[51] Int. Cl.$^5$ .............................................. C08G 77/04
[52] U.S. Cl. ........................................ 528/26; 528/25; 528/29; 528/41
[58] Field of Search ........................ 528/25, 26, 29, 41

[56] References Cited

U.S. PATENT DOCUMENTS 4,794,153 12/1988 Rich ...................................... 528/26

*Primary Examiner*—Melvyn I. Marquis
*Attorney, Agent, or Firm*—William A. Teoli; James C. Davis, Jr.; William H. Pittman

[57] ABSTRACT

There is provided by the present invention aromatic polyester-siloxane block copolymers which can be made by effecting the condensation between tetramethyldisiloxane bisbenzoic acid or acid chloride with a dihydric phenol such as bisphenol A or in combination with a mixture of such tetramethyldisiloxane bisbenzoic acid and aromatic acids, such as terephthalic acid or isophthalic acid. The aromatic polyester-siloxane block copolymers can be used as molding compounds, extruded films, in making composite matrix materials and as flame retardants for aromatic polycarbonates.

10 Claims, No Drawings

AROMATIC POLYESTER-SILOXANE BLOCK COPOLYMERS AND METHOD FOR MAKING

REFERENCE TO RELATED COPENDING APPLICATION

Reference is made to copending application Ser. No. 07/319,026, filed on Mar. 6, 1989, now U.S. Pat. No. 4,916,194, for Flame Retardant Aromatic Polycarbonates filed concurrently herewith and assigned to the same assignee as the present invention.

BACKGROUND OF THE INVENTION

The present invention relates to aromatic polyesters having chemically combined siloxane units and method for making such materials. More particularly, the present invention relates to the employment of certain arylsilicone-containing materials, such as bis(acylchlorophenyl)-tetramethylsiloxane and derivatives thereof and mixtures of such arylsilicon diacids with aromatic organic diacids, such as terephthaloyl and isophthaloyl acids or derivatives with dihydric phenols to produce polyester-siloxane block copolymers.

Prior to the present invention, p,p and m,m-(1,1,3,3-tetramethyl-1,3-disiloxanediyl)bisbenzoic acid and the corresponding diacid chloride was reported by D. W. Lewis and G. C. Gainer, *Journal of the American Chemical Society*, 74, 2931 (1952). There is also reported by J. C. Bonnet and E. Marechal, *Bull. Soc. Chim. Fr.*, 9,3561(1972) that the aforementioned tetramethyldisiloxane bisbenzoic acid or derivative was reacted with ethylene glycol to give a polyester-disiloxane.

The present invention is based on the discovery that aromatic polyester-siloxane block copolymers can be made by effecting reaction between dihydric phenols such as bisphenol A and tetraorganodisiloxanebisbenzoic acid, or the corresponding acid halide thereof having the formula,

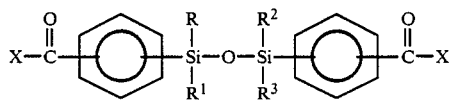
(1)

or mixtures thereof, with aromatic diacids, such as terephthalic acid, or isophthalic acid or the corresponding acid halides where $R-R^3$ of formula (1) are selected from the same or different $C_{(1-13)}$ monovalent hydrocarbon radicals substituted with radicals inert during condensation reactions, and X is selected from hydroxy and chloro. Additional aromatic polyester-siloxane block copolymers can be made by employing the aforementioned aromatic diacids, or mixtures thereof with the bisbenzoic acid tetraorganosiloxane of formula (1), with tetraorganosiloxanebis(imidephenol)s of the formula

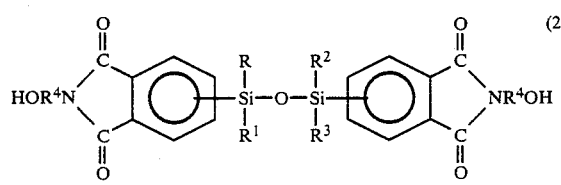
(2)

or mixtures thereof with dihydric phenols, where $R-R^3$ of formulas (1) and (2) and X are as previously defined, and $R^4$ is a $C_{(6-13)}$ divalent aromatic organic radical.

STATEMENT OF THE INVENTION

There is provided by the present invention aromatic polyester-siloxane block copolymers comprising chemically combined aromatic units, selected from the class consisting of dihydric phenol units, aromatic diacid units and condensed mixtures thereof, and 0.1 to 100 mole percent of condensed siloxane units, based on the total moles of condensed polyester units and condensed siloxane units in the aromatic polyester-siloxane block copolymer, where the condensed siloxane units have the formula,

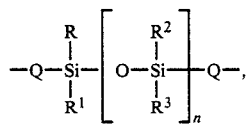

Q is a member selected from the class consisting of

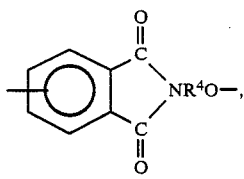
(4)

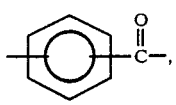
(5)

and mixtures thereof, $R-R^4$ are as previously defined, and n is an integer having a value of from 1 to 200 inclusive.

Radicals included within $R-R^3$ are more particularly $C_{(1-8)}$ alkyl radicals such as methyl, ethyl, propyl, butyl, pentyl and hexyl; substituted alkyl radicals such as trifluoropropyl, cyanoethyl and cyanopropyl; alkenyl radicals, for example, vinyl, propenyl, aralkyl radicals, such as benzyl and phenylethyl; aromatic radicals, for example, phenyl, tolyl, xylyl, anthryl and naphthyl; nitrophenyl, cyanophenyl and chlorophenyl. Radicals included within $R^4$ are, for example, phenylene, tolylene, naphthylene, etc.

Among the aromatic diacids and acid halides which can be employed in the practice of the present invention, there are included, for example, dicarboxylic acids, such as terephthalic acid and isophthalic acid and esters thereof, and dicarboxylic acid chlorides such as

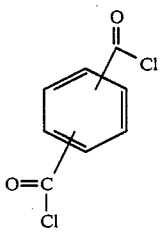

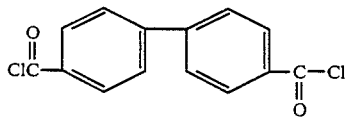

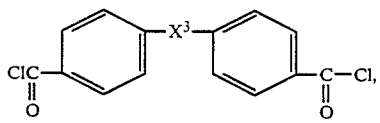

wherein X is O, S, SO²,

or C(R⁵)₂, and R⁵ is H, $C_{(1-8)}$ alkyl, or $CF_3$.

Some of the dihydric phenols which can be used to make the aromatic polyester-siloxanes useful in the practice of the present invention for making poly(arylene silicon) material having chemically combined units of formula (2) are included within the formula

    (8)

where $R^2$ is a $C_{(6-13)}$ divalent aromatic hydrocarbon radical. Dihydric phenols included within formula (8) are, for example, 2,2-bis-(2-hydroxyphenyl) propane, 2,4'-dihydroxybiphenylmethane, bis-(hydroxyphenyl) methane, 2,2-bis-(4-hydroxyphenyl) propane, referred to hereinafter as "bisphenol A" or 'BPA', 1,1-bis(4-hydroxyphenyl)ethane, 1,1-bis(4-hydroxyphenyl)propane, 4,4'-dihydroxybiphenyl, 4,4'-dihydroxy-3,3',5,5'-tetramethylbiphenyl, 2,4-dihydroxybenzophenone, 4,4'-dihydroxydiphenylsulfone, 2,4-dihydroxydiphenylsulfone, 4,4-dihydroxydiphenylsulfoxide and 4,4'-dihydroxydiphenyl-sulfide, tetramethyl bisphenol,1,1-dichloro-2,2-bis(4-hydroxyphenyl)ethylene, 6,6'-dihydroxy-3,3,3',3'-tetramethyl-bis-1,1'-spiroindane,

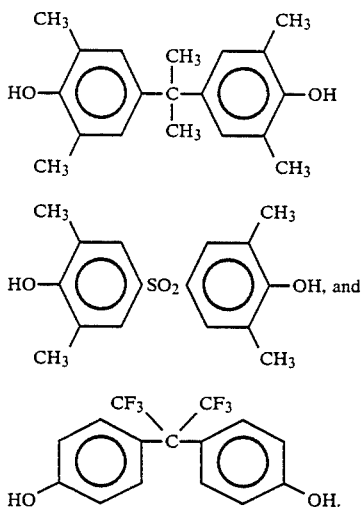

In a further aspect of the present invention, there is provided a method for making aromatic polyester-siloxane block copolymers of the present invention having chemically combined siloxane units of formula (3) by effecting reaction between a tetraorganosiloxane bisbenzoic acid or derivative of formula (1) or a tetraorganodisiloxane bisimide arylhydroxy compound of formula (2), or mixture thereof, and sufficient aromatic diacid and/or aromatic dihydric phenol as previously defined to produce an aromatic polyester-siloxane block copolymer comprising chemically combined aromatic polyester units and 0.1 to 100 mole percent of siloxane units of the formula

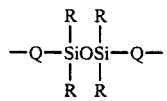    (6)

and thereafter equilibrating the resulting aromatic polyester-siloxane block copolymer with organocyclopolysiloxane of the formula

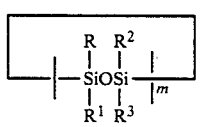    (7)

to produce aromatic polyester-arylsiliconsiloxane block copolymers having chemically combined siloxane units as shown by formula (3), where $R$–$R^3$ are as previously defined and m is an integer equal to from 3 to 8 inclusive.

In the practice of the invention, the aromatic polyester-siloxane block copolymers can be prepared by solution, interfacial or melt polymerization. Temperatures in the range of from about 25° to 300° C. can be used in instances where solution polymerization is employed. An inert organic solvent such as chloroform, o-terphenyl or ditolyl sulfone can be used.

Melt polymerization is preferred and can be utilized at temperatures in the range of from 50° C. to 400° C. The diphenyl ester or dimethyl ester of the tetraorgano bisbenzoic acid of formula (1) can be used with an appropriate dihydric phenol under vacuum to remove the alcohol condensation by-product.

The aromatic polyester-siloxane block copolymers of the present invention can be used in a variety of applications as molding compounds, extruded films, adhesives, coatings, composite matrix material, and as modifying agents when blended with other thermoplastic materials. As shown in copending application Ser. No. 07/319,026, filed concurrently herewith, the aromatic polyester-siloxane block copolymers can be used as additives for polycarbonates to impart flame retardant properties thereto. The aromatic polyestersiloxane block copolymers of the present invention also can be engineered to rigid, high modulus materials for use as structural plastics having desirable thermalstability and resistance to combustion. In instances where the copolymers have silicone blocks of at least 2 chemically combined units, they are found to be ductile while still possessing high thermal stability.

The aromatic polyester-siloxane block copolymers of the present invention can be blended with fillers such as silica filler, glass fibers, carbon fibers, provide for a blend having from 1 to 100 parts of filler by weight per 100 parts of copolymer.

In order that those skilled in the art will be better able to practice the present invention, the following examples are given by way of illustration and not be way of limitation. All parts are by weight.

EXAMPLE 1

A mixture of 0.01 mole of bisphenol A, or an equimolar mixture of bisphenol A and biphenol was added to 60 ml. of a 0.3312 molar standardized sodium hydroxide solution and 60 ml. of distilled water and the resulting mixture was stirred on low speed for 1 to 2 minutes. There was then added, 0.6 grams of sodium dodecylsulfate dissolved in 6 ml. of distilled water. To the resulting mixture there was added, 0.01 mole of 1,3-bis(3-benzoylchloro)-tetramethyldisiloxane or a combination thereof with isophthaloyl chloride and terephthaloyl chloride dissolved in 60 ml. of chloroform. The resulting mixture was stirred in a blender to a higher speed for 15 to 20 minutes and at a lower speed for another 5 minutes. Another mixture was prepared following the same procedure using 0.01 mole of 4,4'-dihydroxydiphenylsulfone and 0.01 mole of the aforementioned bisbenzoylchlorotetramethyldisiloxane. The various condensation mixtures were then respectively poured into a liter of acetone to effect the coagulation of product. The resulting product was filtered, transferred back to the blender which contained distilled water and blended at low speed for 5 to 10 minutes. The product was washed with water for a total of 3 times and filtered each time to ensure removal of any salt. The product was then transferred to a vacuum oven at 60° C. for 12 hours. Based on method of preparation, the product was an aromatic polyester siloxane block copolymer consisting of chemically combined aromatic dihydric phenol units and siloxane diacid units, and aromatic diacid units as shown by the following table, where "DACS" is (1,1,3,3-tetramethyl-1,3-disiloxanediyl)bisbenzoic acid chloride, "BPA" is bisphenol A, "BP" is dihydroxybiphenyl, and "DHS" is 4,4'-dihydroxydiphenylsulfone) "TC" is terephthaloyl chloride and "IC" is isophthaloyl chloride:

TABLE 1

Copolymers Prepared by Interfacial Polymerization

| Diphenol (mole %) | DACS (mole %) | Co-monomer (mole %) | $\overline{M}_n$ | $\overline{M}_w$ | IV* dL/g | $T_g$ | $T_m$ |
|---|---|---|---|---|---|---|---|
| BPA (100) | DACs (100) | — | 17,000 | 39,000 | 0.40 | 125 | — |
| BPA (100) | DACS (30) | IC TC$^\Delta$ (35)(35) | 49,000 | 106,000 | 0.81 | 145 | — |
| BPA BP (50)(50) | DACS (100) | — | 66,000 | 142,000 | — | 140 | (222) |
| BP (100) | DACS (50) | TC (50) | — | — | — | 144 | 287 |
| BP (100) | DACS (100) | — | 24,000 | 51,000 | 0.48 | 100 | 272 |
| DHS+ | DACS | — | 24,000 | 68,000 | 0.49 | 175 | — |

*In CHCl$_3$

The above results show that interfacial polymerization is a satisfactory procedure for preparing a variety of the aromatic polyester-siloxane block copolymers.

EXAMPLE 2

In accordance with the procedure of example 1, 1.5 g of an aromatic polyester siloxane was prepared by reacting isophthaloylchloride/terephthaloyl chloride/DACS/BPA in the molar ratio of 3.5:3.5:3:10 dissolved in 5 ml chloroform. To the solution was added 50 microliters of methanesulfonic acid and 0.6 g octamethylcyclotetrasiloxane. The mixture was heated to 50° C. for 24 hours, cooled and 0.2 g of magnesium oxide powder was added. The mixture was stirred for 30 minutes and filtered. The polymeric product was isolated by precipitation of the chloroform solution into methanol and was dried in vacuo overnight to yield 2.0 g of a white solid. The polymer was analyzed by GPC and found to have an Mn of 17,000 and an Mw of 47,000. The polymer had an intrinsic viscosity in chloroform of 0.7 dl/g and was found to contain silicone blocks consisting of 6.7 dimethylsiloxy repeats units by silicon NMR. The polymer was found to have a Tg of 178° C. by differential scanning calorimetry.

EXAMPLE 3

A solution of 34.24 of bisphenol A, 823 ml. of 10.3646M sodium hydroxide and 105 ml. of triethylamine was stirred for 5 minutes under nitrogen atmosphere. There was then added to the solution, 10.15 g. of terephthaloyl chloride, 10.15 g. of isophthaloyl chloride and 20.57 g. of 1,2-bis(4-benzoylchloro)-1,1,2,2-tetramethyldisiloxane dissolved in 400 ml. of methylene chloride. The contents were stirred vigorously for 4 hours, extracted twice with dilute HCl, five times with deionized water, dried over MgSO$_4$, filtered, precipitated into methanol and dried at 90° C. for 24 hours under vacuum. There was obtained an aromatic polyester-siloxane copolymer having an Mn of 35,900, a M$_w$ of 108,100, a MWD of 3.01 and Tg of 145° C. The siloxane polyester copolymer was melt blended in an extruder with Lexan ® polycarbonate 140 powder, a product of the General Electric Company, at a weight ratio of 5:95 of siloxane polyester to polycarbonate. The blend was injection molded into ⅛" flame bars and tested for flammability by the standard UL94 procedure. The blend was found to be V-O by the UL94 test compared to the polycarbonate control which failed the test due to its propensity to burn and drip once ignited. The oxygen index of the siloxane polyester polycarbonate blend was 37% at ⅛" as compared to a polycarbonate control of 28%.

Although the above examples are directed to only a few of the very many variables which can be used in the practice of the present invention to make the aromatic polyestersiloxane block copolymers, it should be understood that the present invention is directed to the use of a much broader variety of dihydric phenols, aromatic diacids, organic solvents and polyorganosiloxane bisbenzoic acids or organodisiloxane imide aromatic hydroxy compounds shown by formulas (1) and (2) as described in the description preceding these examples.

What is claimed is:

1. An aromatic polyester-siloxane block copolymer comprising chemically combined aromatic polyester units selected from the class consisting of dihydric phenol units, aromatic diacid units and condensed mixtures thereof, and 0.1 to 100 mole percent of condensed siloxane units based on the total moles of condensed polyester units and siloxane condensed units in the aromatic polyester-siloxane block copolymer, where the condensed siloxane units have the formula,

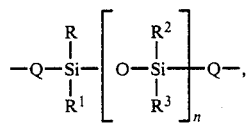

Q is a member selected from the class consisting of

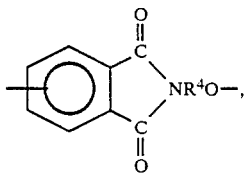

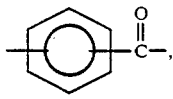

and mixtures thereof, R–R³ are selected from $C_{(1-13)}$ monovalent hydrocarbon radicals and $C_{(1-13)}$ monovalent hydrocarbon radicals substituted with radicals inert during condensation reaction, R⁴ is a $C_{(6-13)}$ divalent aromatic organic radical and n is an integer having a value of from 1 to 200 inclusive.

2. An aromatic polyester-siloxane block copolymer of claim 1, where Q is

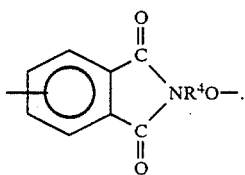

and R⁴ is as defined in claim 1.

3. An aromatic polyester-siloxane block copolymer of claim 1, where Q is

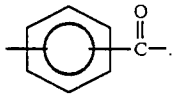

4. An aromatic polyester-siloxane block copolymer of claim 1 where the aromatic polyester block is formed by condensing bisphenol A and terephthaloyl chloride, or a mixture of terephthaloyl and isophthaloyl chloride.

5. An aromatic polyester siloxane block copolymer of claim 1, where the aromatic polyester block results from the condensation of dihydroxybiphenyl.

6. An aromatic-siloxane block copolymer in accordance with claim 1, where R⁴ is phenylene.

7. An aromatic polyester-siloxane block copolymer of claim 1 where the dihydric phenol unit is a bisphenol A unit.

8. An aromatic polyester-siloxane block copolymer of claim 1 where the dihydric phenol unit is a 4,4'-dihydroxy-3,3',5,5'-tetramethyl biphenol unit.

9. An aromatic polyester-silcxane block copolymer of claim 1 where the dihydric phenol unit is a tetramethyl bisphenol A unit.

10. An aromatic polyester-siloxane block copolymer of claim 1 where the dihydric phenol unit is a tetramethyldiphenylsulfone diol unit.

* * * * *